C. ELLIS.
PROCESS OF MAKING EDIBLE OILS, &c.
APPLICATION FILED JULY 26, 1912.
1,052,469.
Patented Feb. 11, 1913.
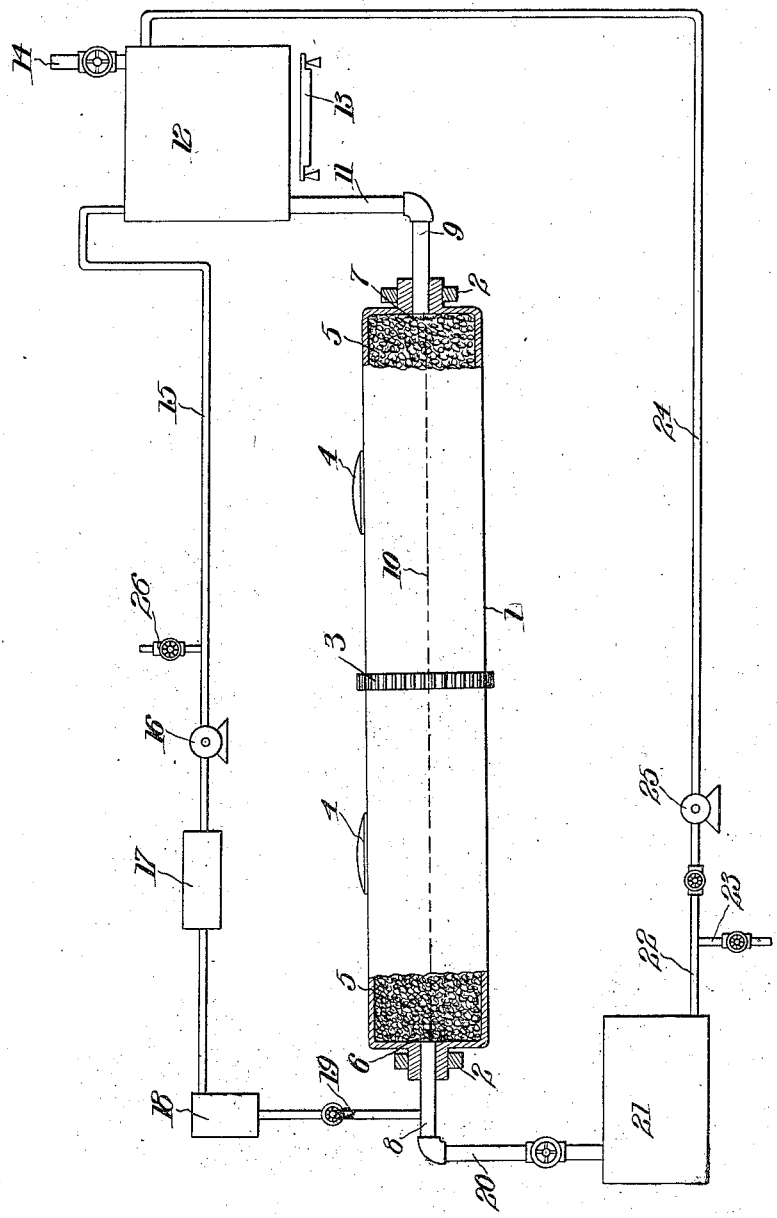
WITNESSES
B. M. Ellis.
F. Corbett.
INVENTOR
Carleton Ellis

UNITED STATES PATENT OFFICE.

CARLETON ELLIS, OF MONTCLAIR, NEW JERSEY.

PROCESS OF MAKING EDIBLE OILS, &c.

1,052,469.  Specification of Letters Patent.  Patented Feb. 11, 1913.

Application filed July 26, 1912. Serial No. 711,745.

*To all whom it may concern:*

Be it known that I, CARLETON ELLIS, a citizen of the United States, and a resident of Montclair, in the county of Essex and State of New Jersey, have invented certain new and useful Improvements in Processes of Making Edible Oils, &c., of which the following is a specification.

This invention relates to the process of treating materials containing unsaturated bodies, which comprises subjecting a body of said material to hydrogen in the presence of a porous mass of catalytic material, and relates in particular to the process of treating a traveling stream of the said material containing unsaturated bodies by the passage through a porous mass of catalytic material, moving substantially transversely to the direction of said stream, and in simultaneously contacting hydrogen with said material.

This application is a divisional continuation of Serial No. 686,988 in particular as regards the rotation of a porous body of catalytic material, through which a current of oil and hydrogen are traveling.

The manner in which my invention is carried out, is made evident from the accompanying drawings, which show apparatus in elevation comprising a rotatory barrel. A portion of the barrel containing catalytic material, is cut away to show the location of the catalyzer. The drawings of this preferred embodiment are purely diagrammatic.

In the drawing, 1 is a cylinder or barrel, supported by the bearings 2, and capable of being rotated by means of the gearings 3.

At 4 are man-holes for charging catalytic material. The catalyzer is shown filling the barrel at 5.

6 and 7 are screens situated at the inlet and outlet to retain the catalyzer.

8 and 9 are inlet and outlet openings, and 10 indicates the level of the oil or other material to be treated, the barrel being suitably inclined in order that the oil may take substantially this position within the rotating or rotary chamber.

11 is a pipe connecting the inlet 9 with the oil tank 12.

13 is a grate adapted to serve for heating the oil contained in the oil tank 12.

14 is an inlet pipe through which is introduced a supply of oil or other material to be treated.

A gas pipe, 15, leads from the oil tank 12, to the pump 16, and from thence to the purifier 17, and the heater 18. A pipe 19, communicates from the heater with the outlet pipe from the lower end of the cylinder or barrel 1. This outlet pipe 20, leads to the receptacle 21, where the oil or other material to be treated, is collected as it discharges from the cylinder 1. At the bottom of the receptacle 21, is an outlet 22, and a withdrawal or exhaust pipe 23. The return pipe 24, in which is interposed a pump 25, leads to the top of the tank 12.

26 is an inlet for hydrogen.

The operation of the apparatus in accordance with this preferred embodiment is as follows:—Oil which has been suitably heated in the tank 12, is allowed to flow in regulated amounts through the pipe 11 into the cylinder or barrel 1. The cylinder is charged with catalytic material, and preferably with abrasive material as is hereinafter described. Hydrogen gas is passed into the cylinder through the pipe 19, and moves in a direction contrary to the flow of the oil. The excess or unused portion of the hydrogen passes out through the pipe 11, and through the oil in the tank 12, being conveyed by means of the pump 16 through the purifier 17, and the heater 18. The cylinder or barrel 1, is put in rotation. The oil is preferably preheated to a temperature of 125° C. to 200° C., depending upon its character and the degree of hydrogenation required. When treating vegetable oils such as corn, cotton-seed, soya bean, rape, linseed, Chinese wood, peanut, and mustard oils and the like, a temperature ranging from 150° C. to about 175° C. is usually suitable. This temperature may be maintained by having the oil preheated to a temperature slightly above that required in the cylinder 1, and the hydrogen gas may also be heated to about the same temperature. If desired the cylinder or barrel 1, may be jacketed in order to reduce loss of heat by radiation. (The jacketing is not shown in the drawing.)

To prepare a suitable catalyzer one may take lumps of pumice of about ½ inch in diameter, and soak them in a solution of nickel nitrate, dry and ignite. I preferably use a quantity of nickel nitrate sufficient to give about 5% of metallic nickel on the fragments of pumice. The so-treated pumice is then heated in a current of hydrogen gas to a temperature of about 325° C. to 350° C. in order to reduce the nickel oxid to the metallic form. These fragments are then immediately saturated with oil in order to prevent access of air, and are charged into the cylinder 1, filling it completely. The oil is allowed to flow through this mass, and hydrogen gas as indicated, is allowed to flow in a direction opposite to the flow of the oil. Or, if desired, the hydrogen may be brought into contact with the oil in any other suitable manner.

In preparing catalyzer in another form, I preferably reduce nickel oxid to produce metallic nickel in a finely divided condition. I mix about 10 pounds of such finely divided material with about 200 pounds of pebbles ranging from ¼ inch to ½ inch in diameter or thereabout, and introduce this mixture into the treating cylinder 1, to charge it preferably entirely full. The rotation of the cylinder is preferably slow, say from 4 to 6 revolutions a minute, in order that the oil preferably may not be unduly agitated, and thus caused to foam undesirably.

While, in its preferred form, the process is continuous, that is non-cumulative, in order to reduce labor cost, and expensive manipulation, it is possible also to make the process an intermittent one as desired. It is also possible to continuously circulate the oil through the treating chamber 1, by means of the piping system 24 and pump 25, the oil being drawn out at the outlet 23, when sufficiently treated.

The treating cylinder or barrel 1, may be suitably heated directly, if desired, by means of a gas flame, or steam jacket or in any other suitable manner. The means for accomplishing this are not shown, being obvious to those skilled in the art.

Suitable catalyzers for the present purpose, in addition to the nickel catalyzer above mentioned, are other metallic catalyzers, such as copper, platinum, and palladium, and the like. Various oxids such as those of nickel, copper, iron, and the like, as well as various salts of these and other metals, may be used as catalyzers for different oils or other unsaturated materials. In the treatment of fish oil, whale oil and the like, it is recommended that a mixed catalyzer consisting of either nickel and cobalt in the metallic condition, or mixtures of nickel and cobalt oxid be employed.

In the present process it does not become necessary to use hydrogen under pressure, although this may be done if desired. The efficient action of the catalyzer under these circumstances is such that pressure need not be resorted to. This is advantageous in handling so penetrating a gas as hydrogen, especially when the apparatus is heated.

What I claim is:—

1. The process of treating material containing unsaturated bodies, which comprises passing a traveling stream of said material in liquid form through a porous bed of catalytic material moving substantially transversely to the direction of said stream, and in simultaneously contacting hydrogen with said material.

2. The process of treating material containing unsaturated bodies which comprises passing a traveling stream of said material in liquid form through a porous bed of catalytic material moving substantially transversely to the direction of said stream, and in simultaneously contacting hydrogen with said material; and in repeatedly passing said material through said porous mass of catalytic material.

3. The process of treating material containing unsaturated bodies which comprises passing a traveling stream of said material slowly through a porous bed of catalytic compound moving substantially transversely to the direction of said stream, and in simultaneously contacting hydrogen as a counter-current, with said material.

4. The process of treating material containing unsaturated bodies which comprises passing a traveling stream of said material slowly through a non-progressing porous bed of catalytic compound moving substantially transversely to the direction of said stream, and in simultaneously contacting hydrogen with said material.

5. The process of treating material containing unsaturated bodies which comprises passing a traveling stream of said material slowly through a non-progressing porous non-rigid bed of catalytic compound moving substantially transversely to the direction of said stream, and in simultaneously passing hydrogen as a counter-current through said porous mass.

6. The process of treating material of an oily nature, containing unsaturated bodies which comprises progressing a mass of said material in a liquid condition and heated to a temperature of at least 150° C. through a porous bed of catalytic compound moving integrally substantially transversely to the direction of said stream and in simultaneously contacting hydrogen with said material.

7. The process of treating material of an oily nature, containing unsaturated bodies which comprises passing a traveling stream of said material slowly through a bed of catalytic compound supported on coarse fragmental bodies, moving integrally substantially transversely to the direction of said stream and in simultaneously bringing a counter-current of a preheated hydrogen-containing gas into contact with the oily material.

8. The process of treating material of an oily nature, containing unsaturated bodies which comprises passing a traveling stream of said material through a bed of catalytic compound supported on coarse fragmental bodies, moving substantially transversely to the direction of said stream and in simultaneously bringing a counter-current of a preheated hydrogen-containing gas into contact with the oily material.

9. The process of treating material of an oily nature, containing unsaturated bodies which comprises passing a traveling stream of said material in a preheated condition through a bed of catalytic compound supported on coarse fragmental bodies, moving substantially transversely to the direction of said stream and in simultaneously bringing a counter-current of a preheated hydrogen-containing gas into contact with the oily material.

10. The process of treating material containing unsaturated bodies which comprises passing a traveling stream of said material slowly through a non-progressing fragmental porous non-rigid bed of catalytic compound moving substantially transversely to the direction of said stream, and in simultaneously contacting hydrogen with said material.

11. The process of treating material containing unsaturated bodies which comprises passing a traveling stream of said material slowly through a non-progressing fragmental porous non-rigid bed of catalytic compound moving substantially transversely to the direction of said stream, and in simultaneously passing hydrogen as a counter-current through said porous mass.

Signed at Montclair in the county of Essex and State of New Jersey this 12th day of June A. D. 1912.

CARLETON ELLIS.

Witnesses:
BIRDELLA M. ELLIS,
A. A. WELLS.